July 16, 1929.  C. C. SWARTZ  1,721,060
FLOATING COUPLING
Filed Dec. 10, 1925  2 Sheets-Sheet 1
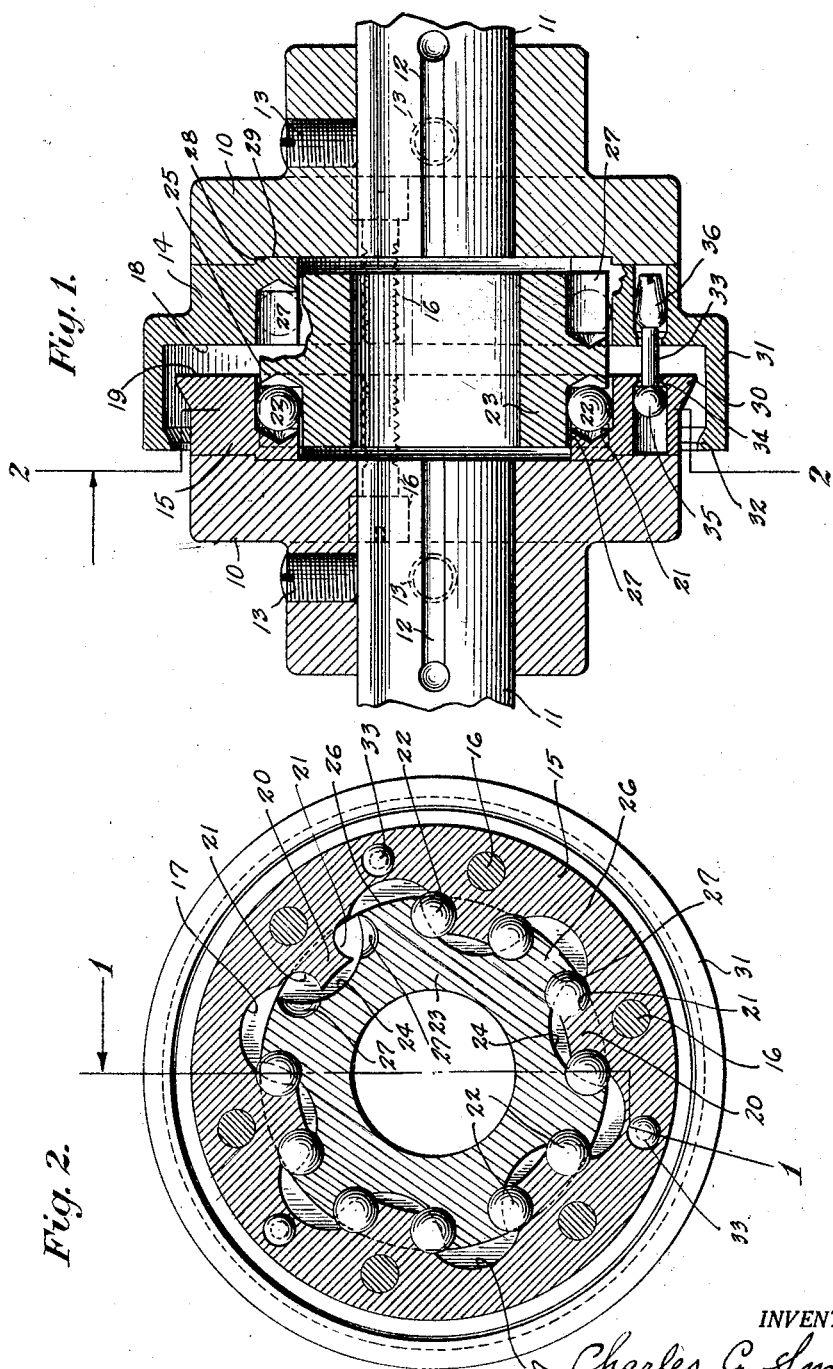

July 16, 1929.  C. C. SWARTZ  1,721,060
FLOATING COUPLING
Filed Dec. 10, 1925   2 Sheets-Sheet 2

INVENTOR.
Charles C. Swartz
BY Wooster & Davis
ATTORNEYS.

Patented July 16, 1929.

1,721,060

UNITED STATES PATENT OFFICE.

CHARLES C. SWARTZ, OF SOUTH NORWALK, CONNECTICUT, ASSIGNOR TO HELEN M. SWARTZ, OF SOUTH NORWALK, CONNECTICUT.

FLOATING COUPLING.

Application filed December 10, 1925. Serial No. 74,490.

This invention relates to a floating or flexible coupling for connecting two shaft sections, and has for an object to provide a coupling of this character which will function efficiently at an angle greater than that of any other flexible or universal coupling of equal power of which I am aware, and therefore, is especially applicable for marine work. It is also an object of the invention to provide a coupling which will permit two misaligned shafts to be so connected that true rotary motion can be transmitted from one to the other without distortion of any member and with a minimum loss of power.

It is a further object of the invention to provide a device of this character which is so constructed that the entire center assembly can be easily removed without moving back or disturbing either shaft, so that either shaft or the machine operated thereby may be run independently. It is a further object of the invention to provide a flexible coupling which will permit a large amount of endwise float and will work efficiently with a large amount of either parallel misalignment, angular misalignment, or a combination of the two.

It is a still further object of the invention to provide a center assembly for a coupling of this type which can be put together at the shop or away from location and easily placed in position without danger of its coming apart or any of the members being lost.

With these and other objects in view I have devised a coupling, one embodiment of which is illustrated in the accompanying drawings, similar reference characters being employed throughout the various figures to indicate corresponding elements. In these drawings Fig. 1 is a longitudinal section through the coupling substantially on line 1—1 of Fig. 2, portions of some of the elements being broken away and some of the antifriction driving elements being omitted to more clearly show the construction.

Fig. 2 is a transverse section substantially on line 2—2 of Fig 1, with some of the antifriction elements omitted.

Figure 3:
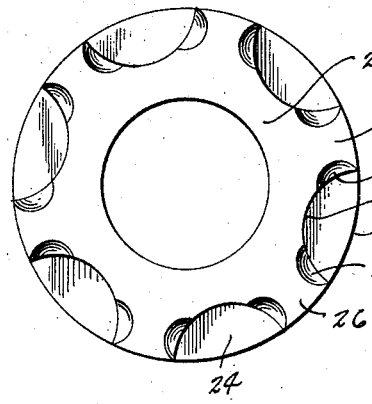
Fig. 3 is an end elevation of the central transmission member.
Figure 4:
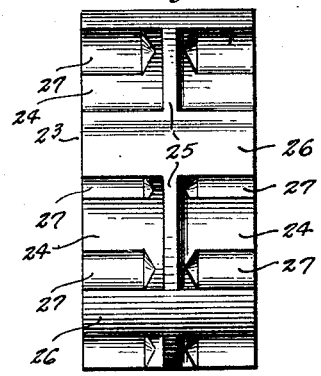
Fig. 4 is a side elevation thereof.

The coupling complete consists of five major members with the required number of antifriction driving elements, in the present specific construction steel balls; bolts and screws. There are two similar standard safety flanges or flange hubs 10 one for each shaft section 11, and these flanges or hubs are connected to the shaft sections by any suitable manner, such as the usual keys 12 and set screws 13. Secured to the opposed faces of these flanges are two similar and interchangeable rings 14 and 15, one of which acts as the driver ring while the other functions as the driven ring, and as they are similar and may function the same in either direction they will both be referred to as driving rings. They are secured to the flanges 10 by means of socket head or ordinary cap screws 16 with the heads protected by a projecting ring on the flange or countersunk into the flange so as to provide complete safety and comply with the legal requirements of all States as to this class of devices. Each ring is provided with a plurality of recesses 17 extending longitudinally from the opposed faces 18 and 19 and opening through the inner wall of the ring but terminating short of the opposite end of the ring. The walls 20 between the recesses are provided with curved grooves 21 also extending longitudinally from the opposed faces of the rings and terminating short of the opposite ends thereof and they also open laterally into the recesses as indicated in Fig. 2. These grooves form races for the antifriction driving elements, shown in this particular construction as steel balls 22.

There is also a central floating transmission member 23 which is enclosed by the driving rings 14 and 15, and it is also preferably a ring so as to be lighter in weight and to accommodate projecting ends of the shaft sections. This transmission member is provided with a plurality of recesses 24 opening laterally through the outer peripheral wall and extending longitudinally from the opposite ends of the member, but terminating short of the center of the member to leave a rib 25 which acts as a strengthening member and also to close the inner ends of the ball races. The recesses 24 and the walls 26 between the same are the same in number as the recesses 17 and walls 20 of the driving rings, but are arranged in alternate relation thereto so that when assembled the walls 26 of the transmission member will extend into the recesses 17 of the driving rings and the walls 20 of the driving rings will extend into the recesses 24 of the transmission member, as indicated in Fig. 2. The transmission member is also provided with curved grooves 27 extending longitudinally from the opposite ends of this member and opening laterally into the recesses 24 to provide ball races similar to the ball races 21 in the driving rings, the inner ends of these races on the transmission member being closed by the rib 25. The races on the transmission member are arranged with their open sides in alignment with and opposed to the races in the driving rings, as indicated in Fig. 2, and a curved antifriction member, in the present construction the steel ball 22, is seated in each pair of opposed races to form driving connections between the driving rings and the transmission member.

The transmission member is provided with proper clearances to allow for the angular and lateral movements required to compensate for the misalignments of the shafts. When assembled, rotary motion is transmitted from one shaft to the other with a minimum of friction as the balls have rolling action thereby giving maximum power and efficiency with a large amount of flexibility, and this center assembly with the balls permits a large degree of endwise float and operation with a large amount of either parallel misalignment, angular misalignment or a combination of both angular and parallel misalignment of the two shaft sections. It will be apparent the rotary motion is transmitted without distortion of any member, and therefore, the material of the members can not become fatigued and broken for this reason in operation, and there is minimum strain on the elements. It is also to be noted from Fig. 2 that with the arrangement as described practically the entire width of the balls is used for transmitting the pressure from one member to the other and that the strain is wholly a compressive strain on the balls without shearing strain, therefore, the maximum strength of the balls is utilized for transmitting the power.

To secure rotary balance a mortise 28 is cut in the faces of the flanges which receives the tenon 29 cut in the face of the driving ring. To cover the space between the driving rings to prevent entrance of dirt, loss of grease and for safety, one of the driving rings is provided with an outwardly extending rib 30 and the other ring is provided with a flange 31 extending outwardly beyond and enclosing this rib and having an inwardly extending rib 32 back of the rib 30, the outer wall of the flange 31 being left smooth. This flange will, therefore, cover the space between the flanges to prevent entrance of dirt and loss of grease, while allowing for the required angular movements.

Means is provided for retaining the center assembly, comprising the driving and driven rings 14 and 15, the transmission member 23 and the balls 22, in assembled relation. This means comprises the screws 33 extending through aligned openings in the rings, which openings are reduced at their inner ends to provide retaining shoulders 34. The screws 33 have round heads 35, and nuts 36 having rounded inner ends and tapered outer surfaces are threaded on the screws. These screws hold the members of the center assembly together so that it can be assembled in a shop or at a distance from location and may be merely applied as a whole to the flanges on the shafts without the necessity of assembling this assembly. It will be obvious that the balls will be retained in the races by the closed ends of the races, and therefore, will not drop out in transporting the assembly. The retaining screws 33 are loose in their openings and this together with the rounded surfaces on the head and nut permit the required angular movement to the rings. This construction also allows easy removal of the center assembly as a whole without disturbing either of the shaft sections or the machine driven thereby, and thus permit either to be driven independently of the other. All the parts of the center assembly can be hardened or heat treated to insure long life and assure that the proper spacing is maintained, while the flanges may be left soft for easy machining, fitting and assembling on the job. By merely changing the standard flange or flange hubs the coupling can be easily changed to another location or to another machine, thereby increasing its usefulness.

The floating inner ring or transmission member is the only major part not rigidly held in place, and it is the only tilting or oscillating part. It will be apparent its weight is only a small part of the entire coupling, and therefore, even when oscillating under gross misalignment vibration and noise are reduced to a minimum. Furthermore, its movement is not visible as it is fully enclosed by the rigid parts of the coupling.

Figure 5:
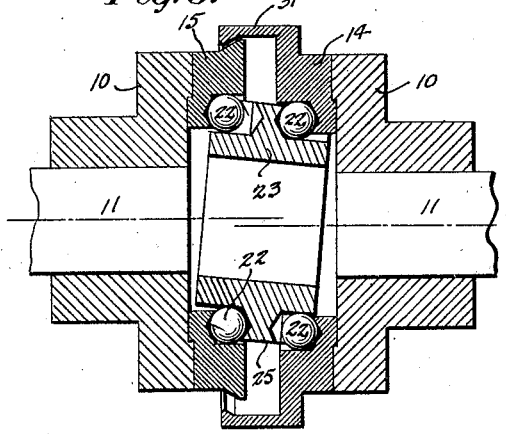
Fig. 5 is a view similar to Fig. 1 on a reduced scale showing the position of the elements to compensate for parallel misalignment of the connected shafts.
Figure 6:
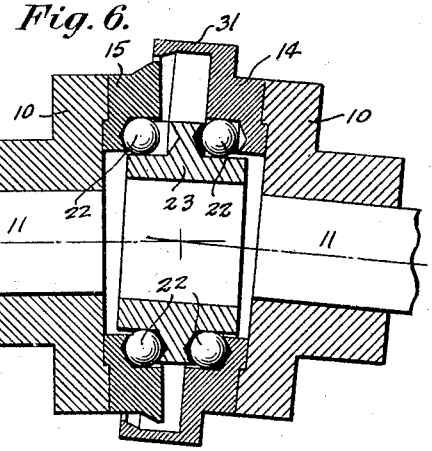
Fig. 6 is a similar view showing the positions for angular misalignment of the shafts.
Figure 7:
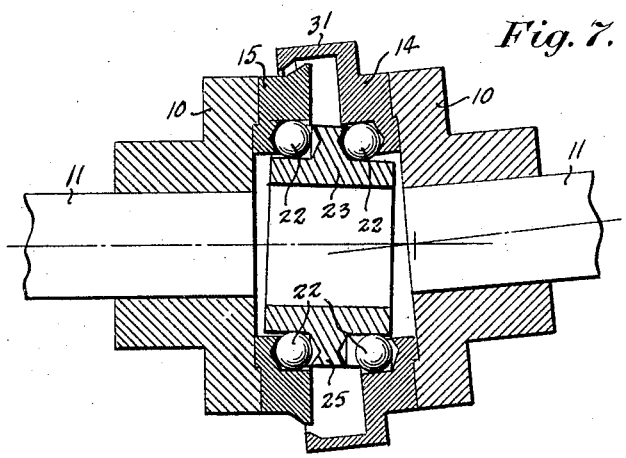
Fig. 7 is a similar view showing the combination of both angular and parallel misalignment.

It will be apparent from Figs. 1, 5, 6 and 7 that the two sets of balls are placed relatively close together, and therefore, the power is transmitted very nearly in a single plane, and this close coupling allows power to be transmitted through a large degree of angularity. It has been found that this coupling functions efficiently at an angle more than twice that of any other flexible or universal coupling of equal power of which I am aware, and almost as much as a universal joint. For this reason it is especially applicable for marine work. It will also be apparent that the balls may move easily in the races with a minimum of friction, and therefore, permit endwise float with a minimum of friction and heating and also a maximum of efficiency. As the balls allow free rocking movement there is no distortion of any of the elements. The balls hold all the members firmly in place and permit the floating inner ring to find its normal position without friction. Also the difficulty of properly lubricating flexible couplings is overcome by the use of these balls.

Having thus set forth the nature of my invention, what I claim is:

A flexible coupling assembly adapted to be secured to the opposed faces of two spaced flanges, comprising a pair of rings adapted to be secured to said flanges having grooves opening laterally through the inner walls of the rings and extending longitudinally from the opposed faces of the rings, said grooves terminating at a distance from the opposite end walls of the rings, a central transmission member within the rings having grooves opening laterally through the outer peripheral wall thereof and extending longitudinally from the opposite ends of said member, said grooves in the central member terminating at a distance from the center of this member and arranged in circumferential alignment with the grooves in the rings, curved anti-friction members in the aligned grooves forming driving connections between the rings and the transmission member, and connecting bolts extending transversely through the rings and loosely connecting them together and about the transmission member.

In testimony whereof I affix my signature.

CHARLES C. SWARTZ.